United States Patent [19]

Daigaku et al.

[11] Patent Number: 4,658,306

[45] Date of Patent: Apr. 14, 1987

[54] METHOD OF RECORDING IDENTIFICATION SIGNAL ON SOFTWARE RECORDING MEDIUM

[75] Inventors: Masaaki Daigaku; Shoichi Saito, both of Tokyo, Japan

[73] Assignee: Olympus Optical Co., Ltd., Tokyo, Japan

[21] Appl. No.: 848,329

[22] Filed: Apr. 3, 1986

Related U.S. Application Data

[63] Continuation of Ser. No. 627,775, Jul. 5, 1984, abandoned.

[30] Foreign Application Priority Data

Jul. 8, 1983 [JP] Japan ................... 58-123492

[51] Int. Cl.$^4$ ................... G11B 5/02; G11B 20/20
[52] U.S. Cl. ................... 360/22; 360/26; 360/27
[58] Field of Search ................... 360/22, 26, 27, 77, 360/60, 47; 369/86–88

[56] References Cited

U.S. PATENT DOCUMENTS 3,337,693' 8/1967 Silverstein ................... 360/22
3,593,333 11/1969 Oswald ................... 360/77
4,460,929 7/1984 Bader ................... 360/27

Primary Examiner—Vincent P. Canney
Attorney, Agent, or Firm—Frishauf, Holtz, Goodman & Woodward

[57] ABSTRACT

According to a method of recording identification signals on a software recording medium of the invention, an identification signal is recorded in a left channel track of a soft tape, and an inverted signal of the identification signal is recorded in a right channel track of the soft tape. Non-inverted program signals are in the right channel and left channel tracks. For this reason, the identification signal and the inverted identification signal cancel each other in a program play mode of the soft tape.

14 Claims, 15 Drawing Figures

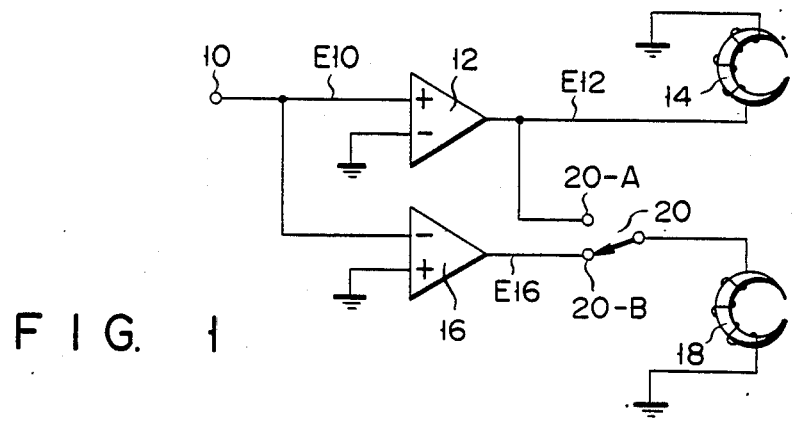
F I G. 1
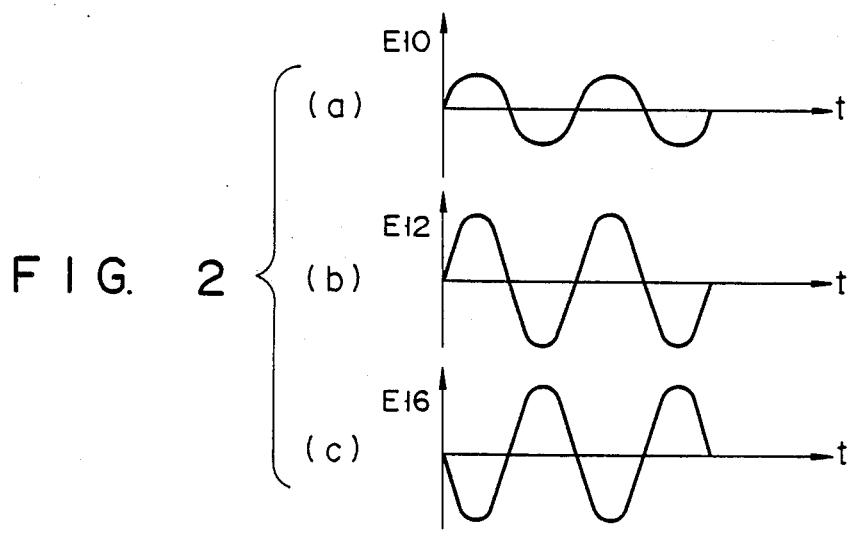
F I G. 2
F I G. 3
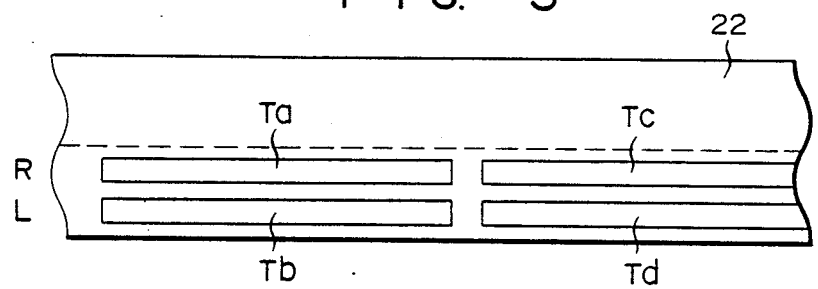

METHOD OF RECORDING IDENTIFICATION SIGNAL ON SOFTWARE RECORDING MEDIUM

This application is a continuation, of application Ser. No. 627,775, filed July 5, 1984, now abandoned.

BACKGROUND OF THE INVENTION

The present invention relates to an improvement in a method of recording an identification signal on a software recording medium.

Conventional tape recorders have been frequently used as external memory devices (data storage) for so-called portable electronic calculators and personal computers. Cassette tapes (to be referred to as soft tapes) for storing a signal, for example, computer programs and data for controlling a computer (to be referred to as a program signal) are mass-produced. In the manufacture of these soft tapes, it is necessary to check that the labels of these soft tapes and their contents match. However, in general, computer programs are recorded as repeated signals. It is almost impossible to judge the contents of the programs in accordance with the reproduced sounds, unlike normal music or audio tapes. Conventionally, identification signals are respectively recorded on parts of the soft tapes. The identification signal comprises an audio signal of an audible frequency, or a spot signal. However, in order to prevent erroneous operation of a computer, the identification signal frequency must fall outside the frequency band of the program signals. In addition to this restriction, the recording level of the identification signal must be lower than that of the program signal. In practice, computers and the like have often been erroneously operated when the soft tape is reproduced due to the presence of the identification signal.

SUMMARY OF THE INVENTION

The present invention has been made in consideration of the above situtation, and has as its object to provide a method of recording an identification signal whose frequency is flexible and whose level can be obtained, and in which an adverse effect caused by the identification signal upon reproduction of the soft tape can be eliminated.

In order to achieve the above object of the present invention, there is provided a method of recording an identification signal on a software recording medium, wherein a first identification signal is recorded in at least one first recording track of a software recording medium, and a second identification signal is recorded in at least one second recording track of the software recording medium, the second identification signal being cancelled when said second identification signal is mixed with the first identification signal in a play mode.

According to this method of recording the identification signal on the software recording medium, the first and second identification signals are not reproduced upon reproduction of the recording medium. For this reason, the frequency and level of the identification signals can be freely selected. In addition, the identification signals will not adversely affect software recorded on the recording medium. Furthermore, the identification signals can be easily checked during the manufacture of the recording media as needed.

BRIEF DESCRIPTION OF THE DRAWINGS

FIG. 1 is a circuit diagram of a signal recording circuit used in a method of recording identification signals on a software recording medium according to an embodiment of the present invention;

FIGS. 2(a) to 2(c) are respectively timing charts of signals generated in the respective components of the signal recording circuit of FIG. 1;

FIG. 3 is a plan view showing signal recording regions of a surface of a soft tape;

DETAILED DESCRIPTION OF THE PREFERRED EMBODIMENTS

Figure 4:
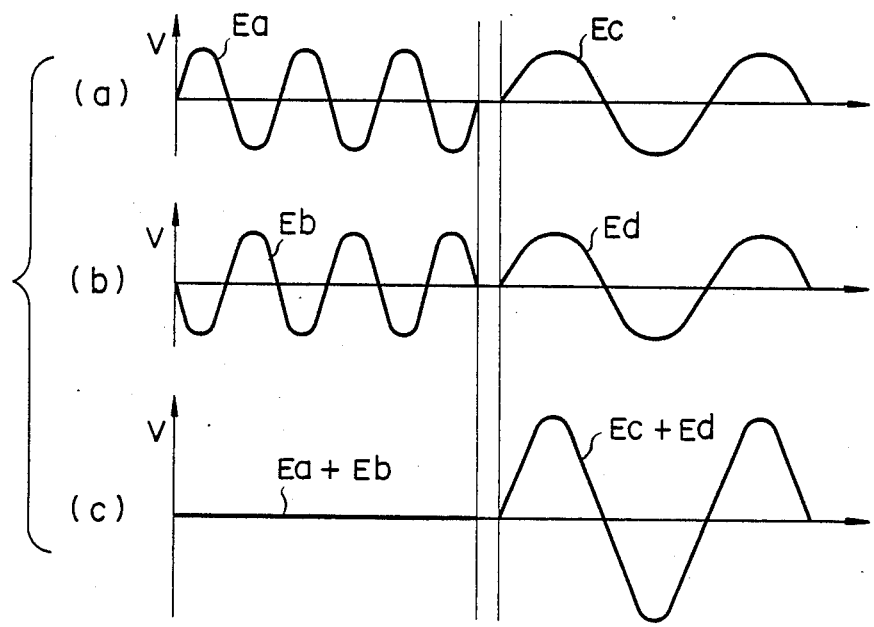
FIGS. 4(a) and 4(b) are timing charts of signals recorded in the regions of FIG. 3, respectively.
FIG. 4(c) is a timing chart of a composite signal of the signals shown in FIGS. 4(a) and 4(b)

A method of recording identification signals on a software recording medium according to an embodiment of the present invention will be described with reference to the accompanying drawings. FIG. 1 shows a signal recording circuit for implementing the method of the first embodiment. Referring to FIG. 1, an input terminal 10 is connected to the noninverted input terminal of an amplifier 12. The inverted input terminal of the amplifier 12 is grounded. The output terminal of the amplifier 12 is connected to an L-channel (Lch) head 14. The input terminal 10 is also connected to the inverted input terminal of an inverting amplifier 16. The noninverted input terminal of the inverting amplifier 16 is grounded. The output terminal of the inverting amplifier 16 is connected to a contact 20-B of a switch 20. The switch 20 comprises, for example, a relay switch. The switch 20 is connected to an R-channel (Rch) head 18. The output terminal of the amplifier 12 is connected to a contact 20-A of the switch 20. By way of simplicity, the gain of the amplifier 12 is assumed to be the same as the absolute value of the gain of the inverting amplifier 16. Furthermore, the Lch head 14 is assumed to have the same performance as the Rch head 18, and the track widths of the tapes to be recorded with the heads 14 and 18 are assumed to be the same.

The operation of the signal recording circuit shown in FIG. 1 will now be described. A signal E10 shown in FIG. 2(a) is supplied from a signal source (not shown) to the input terminal 10. The amplifier 12 amplifies the signal E10 without shifting the phase thereof and generates a signal E12. The signal E12 has the same phase as the signal E10, as shown in FIG. 2(b). The signal E12 is supplied to the Lch head 14. The Lch head 14 records the signal E12 in an Lch recording track. Meanwhile, the signal E10 is also supplied to the inverting amplifier 16. The inverting amplifier 16 inverts the phase of the signal E10 and amplifies it to generate a signal E16. The signal E16 has the opposite phase to that of the signal E12, as shown in FIG. 2(c). The signal E16 is supplied to the switch 20. When identification signals are recorded on the soft tape, the switch 20 is switched to the position of the contact 20-B. In this state, the signal E16 is supplied to the Rch head 18 through the switch 20. However, when the other signal, i.e., the program signal is recorded on the soft tape, the switch 20 is switched to the position of the contact 20-A. In this state, the signal E12 is supplied to the Rch head 18. The switching operation of the switch 20 is performed in response to a switching signal (not shown). The identification signals are thus recorded in the Lch and Rch recording tracks in the opposite phases. On the other hand, the program signals are recorded in the Lch and Rch recording tracks in the same phase. As described above, the absolute value of the gain of the inverting amplifier 16 is the same as that of the amplifier 12. The Lch head 14 has the same characteristic as those of the Rch head 18, and the Rch track width is the same as the Lch track width. The identification signal recorded in the Lch track has the opposite phase but the same frequency and amplitude as that of the identification signal recorded in the Rch track. The program signal recorded in the Lch track has the same phase, frequency and amplitude as that of the program signal recorded in the Rch track.

A case is illustrated in FIG. 3 wherein the signals are recorded by the circuit of FIG. 1 in the recording tracks of the soft tape. Referring to FIG. 3, track regions Ta, Tb, Tc and Td are formed in a magnetic surface of a soft tape 22. A signal Ea as the inverted signal of an identification signal Eb is recorded by the Rch head 14 in the Rch track region Ta. The identification signal Eb is recorded by the Lch head 14 in the Lch track region Tb. Program signals Ec and Ed are recorded in the regions Tc and Td, respectively. The waveforms of the signals Ea and Ec recorded in the Rch track and the waveforms of the signals Eb and Ed recorded in the Lch track are illustrated in FIGS. 4(a) and 4(b), respectively. The signal Ea recorded in the region Ta has the opposite phase but the same frequency and amplitude as the signal Eb recorded in the region Tb. On the other hand, the signal Ec recorded in the region Tc has the same phase, frequency and amplitude as the signal Ed recorded in the region Td. When the soft tape recorded in this manner is played with a two-channel stereo head unit, outputs having the waveforms shown in FIGS. 4(a) and 4(b) can be obtained. However, when the soft tape of FIG. 3 is played with a monaural head, or when the outputs are reproduced with the two-channel stereo head unit and combined, a signal having a waveform shown in FIG. 4(c) can be obtained. The signal Ea cancels the signal Eb, and the resultant signal level becomes zero. On the other hand, when the signals Ec and Ed are combined, the resultant signal has the same phase and twice the amplitude as the signal Ec or Ed. According to the soft tape recorded by the method according to the present invention, when a monaural tape-recorder is used, the identification signals cannot be reproduced, but other signals (e.g., program signals) can be reproduced. However, when a stereo tape-recorder is used, both the identification and program signals can be reproduced. In general, cassette tape-recorders for computer soft tapes have monaural heads. As a result, the identification signals cannot be reproduced. When a monaural/stereo dual-mode cassette tape-recorder is used, the identification signals cancel each other when the monaural mode is selected. In this manner, in the play mode, only the program signal Ec+Ed is reproduced, but the identification signal Ea and Eb cancel each other. Even if the frequency and level of the identification signals are arbitrarily selected, these signals will not be mixed with the program signals. The identification signals recorded on the soft tape 22 will not adversely affect the reproduced program signals. When identification signals must be reproduced, signals recorded in one of the Lch and Rch tracks are reproduced or one of the reproduction signals in the two tracks is inverted and thereafter combined with another reproduction signal (i.e., substracted). When one reproduced output is phase-inverted and the resultant signal is combined with the other reproduced output, the program signal components cancel each other. On the other hand, the identification signal component Ea+Eb has a doubled amplitude, thereby producing an identification signal component with a sufficient level for easy detection. Therefore, during the manufacture of the soft tapes, the contents of the soft tapes can be easily checked.

Figure 5:
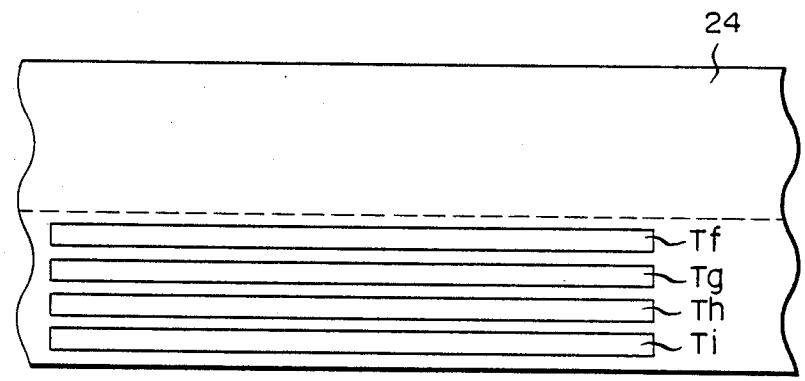
FIG. 5 is a plan view showing signal recording regions of a magnetic surface of a soft tape by a method of recording identification signals according to another embodiment of the present invention.
Figure 6:
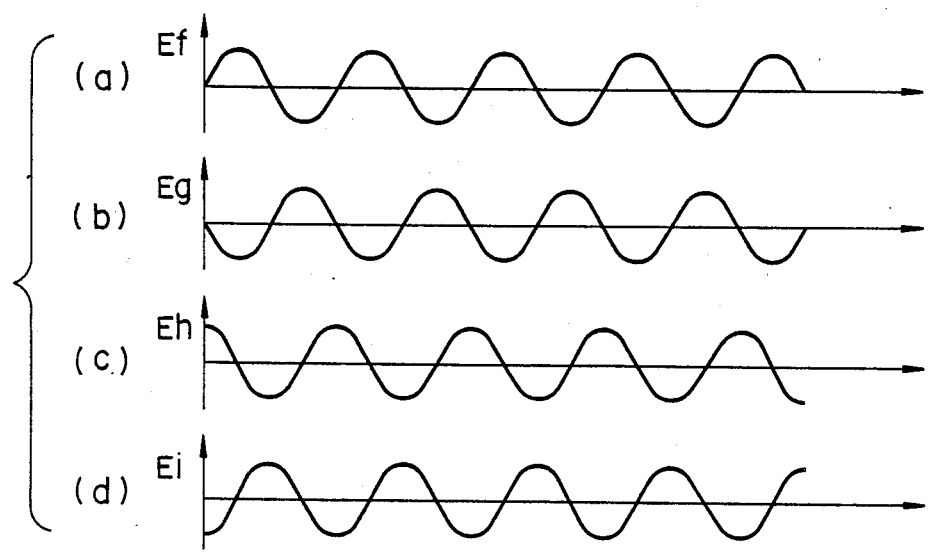
FIGS. 6(a) to 6(d) are timing charts of signals recorded in the regions of FIG. 5.

FIG. 5 shows signal recording regions of a magnetic tape recorded according to a method of recording identification signals on a soft tape according to a second embodiment of the present invention. A soft tape 24 has four tracks. Identification signals Ef, Eg, Eh and Ei are recorded in track regions Tf, Tg, Th and Ti, respectively. FIGS. 6(a) to 6(d) are waveforms of the signals Ef, Eg, Eh and Ei recorded in the track regions Tf, Tg, Th and Ti, respectively. When the signals Ef, Eg, Eh and Ei having different phases as shown in FIGS. 6(a) to 6(d) are combined, the signal Ef cancels the signal Eg, and the signal Eh cancels the signal Ei. For this reason, the identification signals cannot be reproduced with a monaural or two-channel stereo head. When the identification signals must be reproduced, only the signal Ef, for example, is reproduced. Alternatively, the reproduced outputs of the signals Ef and Eg may be combined after inverting the one reproduced output thereof. The phase of the signal Ef is shifted from that of the signal Eh, and the phase of the signal Eg is also shifted from that of the signal Ei. However, the phase of the signal Ef or Eg may be the same as that of the signal Eh or Ei.

In the above embodiments, the soft tapes comprise 2- and 4-track tapes. However, the present invention is not limited to these types of soft tapes. The number of tracks may be arbitrarily selected. In addition, the amplitudes, frequencies and phases of identification signals recorded in the tracks may differ from each other. It is only essential for the reproduced identification signal component to have a sufficiently low level as to be neglected. Similarly, tracks of a soft tape may have different widths, and only some (e.g., two tracks) of the tracks (e.g., four tracks) may be used for recording identification signals. On the other hand, since the program signals have the same phase, they will not cancel each other upon reproduction. In order to reproduce the identification signals, the following processing is performed. The identification signals recorded in the opposite phases are reproduced separately. One of the reproduced signals is inverted and combined with the other reproduced signal to produce the indentification signal. In this case, the program signals cancel each other. The signals Ec and Ed of the same amplitude, frequency and phase are recorded in the regions Tc and Td of FIG. 3, respectively. However, the present invention is not limited to the above recording. For example, an identification signal sin ωt may be recorded in two of the three tracks, and identification signals −2sin ωt may be recorded in the remaining track. When these three identification signals are reproduced by a single monaural head, the identification signals can cancel each other.

Figure 7:
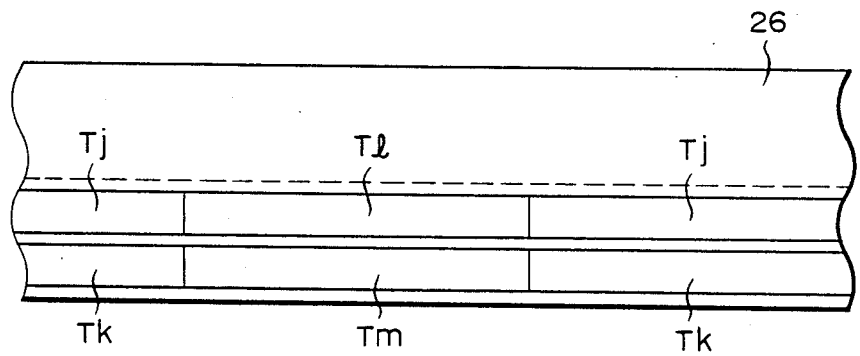
FIG. 7 is a plan view showing signal recording regions of a magnetic surface of a soft tape by a method of recording identification signals according to still another embodiment of the present invention.

In the embodiment shown in FIG. 3, the regions Ta and Tb for the identification signals are independent of the regions Tc and Td for the program signal. However, the track region distribution is not limited to this. For example, in a soft tape 26 shown in FIG. 7, the identification signals and the program signals may be combined and recorded in regions Tl and Tm. Referring to FIG. 7, the regions Tj and Tk are the regions in which only the program signals are recorded. The regions Tl and Tm are regions in which the identification signals and the program signals are recorded. In this case, when the identification signals recorded in the regions Tl and Tm are reproduced with a monaural head, they cancel each other since the identification signals have the opposite phases. On the other hand, the program signals are combined and reproduced. According to the recording method of FIG. 7, the soft tape can be more effectively used than in the case in which the program signals and the identification signals are recorded separately. It should be noted that the identification signals can also be recorded together with the program signals in an overlapped manner in the embodiment shown in FIG. 5. A method for identifying the contents of recorded program signals by the reproduced identification signals, can be implemented through conventional techniques in which such identification signals are recorded on a common medium with the identified program signals. For example, names of programs or names of entire soft tapes can be recorded on a soft tape as identification signals in the form of a human voice. Then, according to the present recording-/reproducing method, only the identification signals in one of the recording channels or tracks is reproduced to identify the program name by way of the reproduced signal. The reproduced identification signal also can be monitored with an oscilloscope to detect the names of the programs. Spot signals can be recorded as identification signals, and then reproduced to specify the types of recorded programs.

In the embodiments shown in FIGS. 3 and 5, the identification signals and program signals are not limited to specific types. For example, amplitude-modulated (AM) signals, frequency-modulated (FM) signals, and phase-modulated signals can all be used as identification and program signals. In addition, the identification and program signals may be analog or digital signals.

Figure 8:
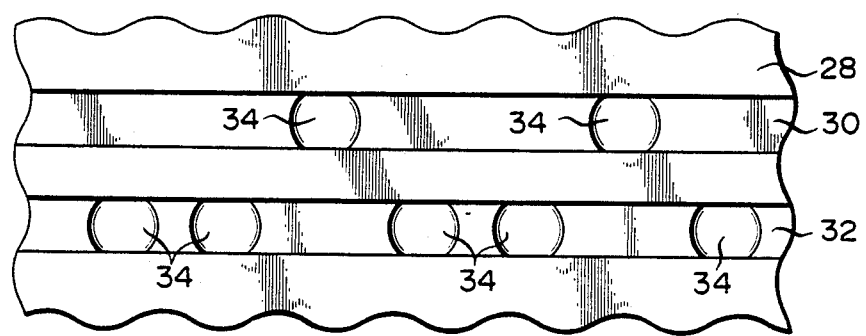
FIG. 8 is an enlarged plan view of part of an optical disk to which the present invention is applied.

In the above embodiments, the software recording medium comprises a magnetic-tape, especially a cassette tape. However, any other software recording medium such as an optical disk can be used in place of the soft tape. FIG. 8 shows an embodiment using an optical disk 28 to which the present invention is applied. FIG. 8 is an enlarged plan view showing part of the optical disk 28. Pits 34 are formed in first and second pregrooves 30 and 32. Referring to FIG. 8, the first pregroove 30 has no pit in the position corresponding to a position of the second pregroove 32, and vice verse. More particularly, when a signal 0010010... is recorded in the first groove 30, a signal 1101101... is recorded in the second groove 32. It should be noted that the pits 34 correspond to a signal of logic level "1". An inverted signal of a signal recorded in the first pregroove 30 is recorded in the second groove 32. In this manner, the bits of the identification signal recorded in the first groove 30 have an inverted logic level as compared to the bits of the identification signal recorded in the second groove 32, so that these identification signals cancel each other. The present invention can also be applied to another software recording medium such as a magnetic tape, a disk and a floppy disk.

What is claimed is:

1. A method of recording signals on a software recording medium having first and second tracks, said method comprising the steps of:
    recording a program signal for controlling a computer on the first and second tracks, thereby forming a first recorded program signal on the first track and a second recorded program signal on the second track;
    carrying out said program signal recording step so that the first and the second recorded program signals are substantially identical to one another in amplitude, frequency and phase;
    recording on the first track a first identification signal selected to identify the program signal; and
    recording on the second track a second identification signal substantially identical to the inverted signal of the first identification signal.

2. A method according to claim 1, including separately reproducing the first and second identification signals.

3. A method according to claim 1, wherein said software recording medium comprises a magnetic tape.

4. A method according to claim 1, wherein said software recording medium comprises a cassette tape.

5. A method according to claim 1, wherein said software recording medium further comprises a third recording track and a fourth recording track, a third identification signal is recorded in the third recording track, and a fourth identification signal having an opposite phase to that of the third identification signal and the same frequency and amplitude as that of the third identification signal is recorded in the fourth recording track.

6. A method according to claim 1, wherein said first and second recording tracks are recorded with same program signals, respectively, and the first and second identification signals are recorded in said first and second recording tracks in an overlapped manner with the program signals.

7. A method according to claim 1, wherein said software recording medium comprises an optical disk.

8. A method according to claim 7, wherein the first and second identification signals comprise digital signals, the second identification signal being an inverted signal of the first identification signal.

9. A software recording medium, comprising:
    a first recording track on which a first program signal for controlling a computer and a first identification signal are recorded, said first identification signal representing the contents of said program signal; and
    a second recording track on which a second program signal and a second identification signal are recorded;
    said second program signal being substantially identical to said first program signal in amplitude, frequency and phase; and said second identification signal being substantially identical the inverted signal of said first identification signal.

10. A software recording medium according to claim 9, wherein said software recording medium is a magnetic tape.

11. A software recording medium according to claim 9, wherein said software recording medium is a cassette tape.

12. A software recording medium according to claim 9, further comprising:
a third identification track recorded with a third signal; and
a fourth identification track recorded with a fourth signal having the same amplitude and the same frequency in the opposite phases as the third identification signal.

13. A software recording medium according to claim 9, wherein a program signal is superimposed on the first identification signal on the first track and is superimposed on the second identification signal of the second track.

14. A software recording medium according to claim 9, wherein the first and second identification signals are separately reproducable.

* * * * *